United States Patent [19]
Takahashi et al.

[11] Patent Number: 5,910,859
[45] Date of Patent: Jun. 8, 1999

[54] IMAGE STABILIZING APPARATUS

[75] Inventors: Kenichi Takahashi; Kouichi Nagata, both of Omiya, Japan

[73] Assignee: Fuji Photo Optical Co., Ltd., Saitama, Japan

[21] Appl. No.: 08/936,533

[22] Filed: Sep. 24, 1997

[30] Foreign Application Priority Data

Oct. 1, 1996 [JP] Japan .................................. 8-280264

[51] Int. Cl.$^6$ .................................................. G02B 27/64
[52] U.S. Cl. .......................................... 359/554; 359/557
[58] Field of Search .................................. 359/554–557, 359/813, 814, 823, 824, 831–837; 396/52–55; 348/208

[56] References Cited

U.S. PATENT DOCUMENTS

| | | | |
|---|---|---|---|
| 4,269,489 | 5/1981 | Takimoto ................................. | 352/174 |
| 5,181,056 | 1/1993 | Noguchi et al. ......................... | 359/554 |
| 5,285,313 | 2/1994 | Kobayashi et al. ...................... | 359/554 |
| 5,539,575 | 7/1996 | Kakizawa et al. ....................... | 359/557 |
| 5,633,756 | 5/1997 | Kaneda et al. .......................... | 359/557 |
| 5,748,995 | 5/1998 | Kitagawa et al. ....................... | 359/557 |

FOREIGN PATENT DOCUMENTS

| | | |
|---|---|---|
| 57-37852 | 8/1982 | Japan . |
| 6250100 | 9/1994 | Japan . |
| 0743645 | 2/1995 | Japan . |

OTHER PUBLICATIONS

English Abstract of Japanese Reference No. 07–43645.
English Abstract of Japanese Reference No. 61–288664.
English Abstract of Japanese Reference No. 6–250100.
English Abstract of Japneese Reference No. 54–23554.
Oshima et al, "VHS Camcorder With Electronic Image Stabilizer", IEEE Transactions on Consumer Electronics, 35 (1989) Nov. N.4, New York.

*Primary Examiner*—Thong Nguyen
*Attorney, Agent, or Firm*—Snider & Chao; Ronald R. Snider

[57] ABSTRACT

It is judged whether or not the pivotal movement of gimbal suspension is in a locked state. When the gimbal suspension is judged to be in the locked state, an actuator is stopped, and an operator is informed of this state, whereby the actuator can be prevented from being damaged, and the operator can rapidly respond to the locked state. An angular velocity value detected by an angular velocity sensor is read out (S6); an angle value detected by a position sensor is read out (S7); the read-out value of detedted angular velocity is subracted from an amplified value of detected angle (S9); the value resulting from the subtraction is integrated with respect to time (S10); and it is judged whether or not the gimbal suspension is in a locked state (S11). If it is consequently judged that the gimbal suspension is in the locked state, the control system is stopped (S12), and an alarm LED is flickered (S13).

5 Claims, 9 Drawing Sheets

F I G .1
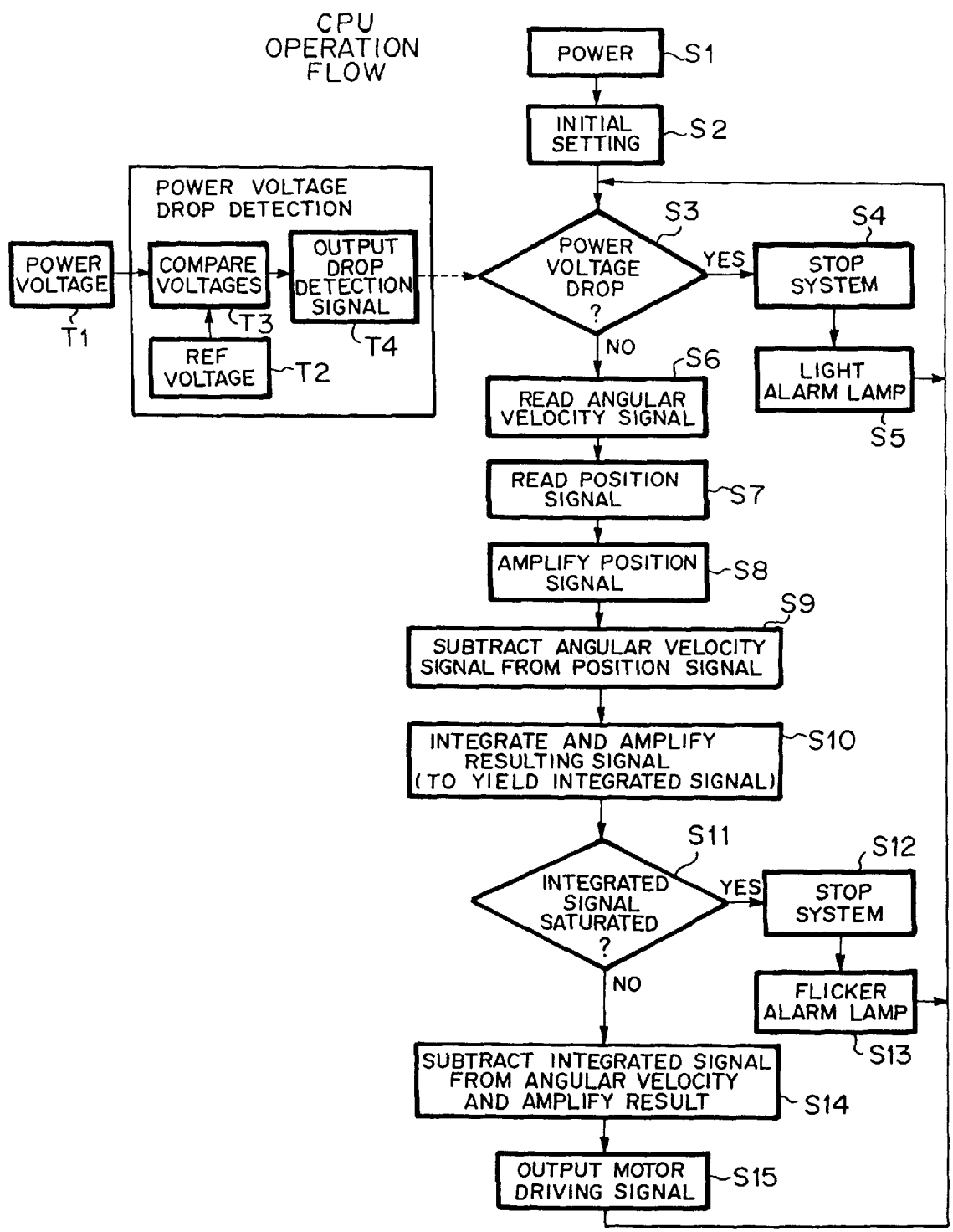

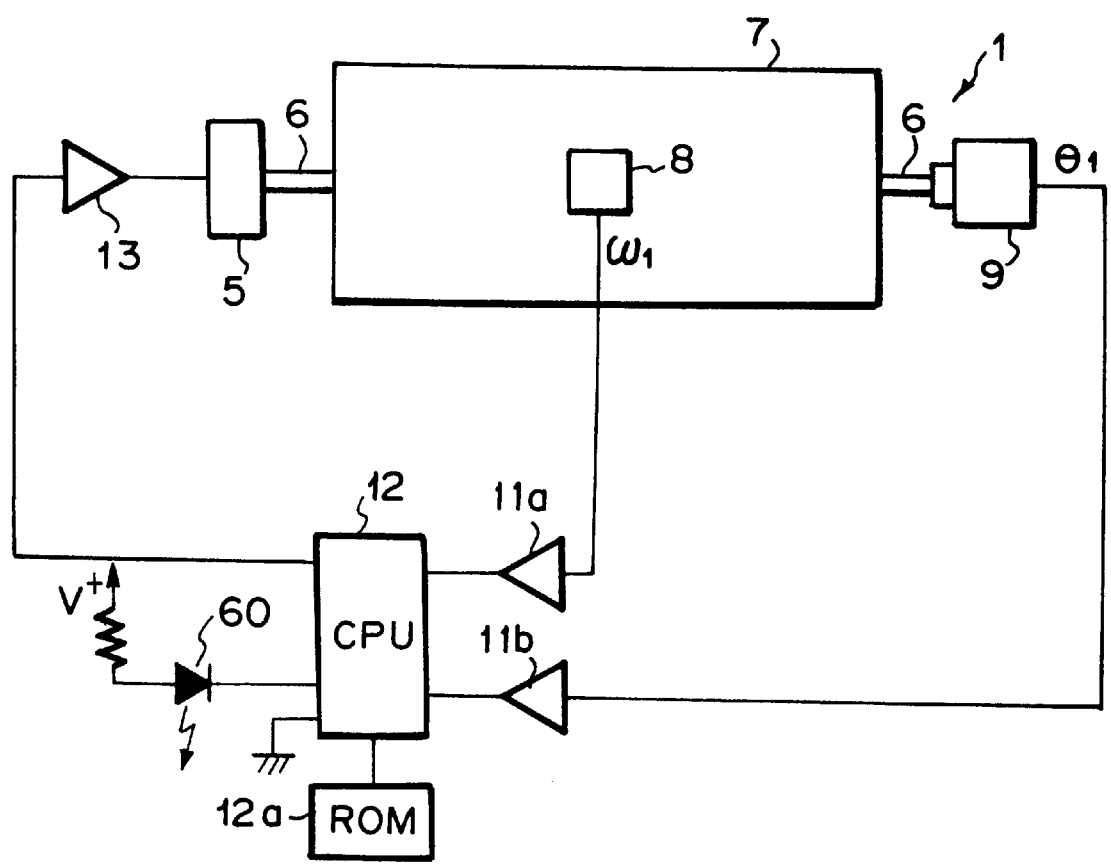
F I G. 7

IMAGE STABILIZING APPARATUS

RELATED APPLICATIONS

This application claims the priority of Japanese Patent Application No. 8-280264 filed on Oct. 1, 1996, which is incorporated herein by reference.

BACKGROUND OF THE INVENTION

1. Field of the Invention

The present invention relates to an image stabilizing apparatus which is disposed within an optical apparatus such as monocular, binocular, or video camera in order to prevent optical images from being blurred upon viewing when the angle of emission of a luminous flux from the viewed object with respect to the optical axis of such an optical apparatus fluctuates upon vibration.

2. Description of the Prior Art

In cases where an optical apparatus, such as monocular or binocular, aimed for optical viewing is operated as being held with a hand, in particular when the optical apparatus is used as being brought into an airplane, vehicle, or the like, vibration or rolling of the airplane, vehicle, or the like is transmitted to the optical apparatus, whereby the angle of emission of the luminous flux from the viewed object with respect to its optical axis is likely to fluctuate. As a result, the viewed optical image often deteriorates. Even when such a vibration transmitted to the optical apparatus has a small amplitude, the angle of fluctuation with respect to the optical axis is magnified since the monocular, binocular, or the like has a narrow visual field and magnifies the object upon viewing. Hence, the viewed image may move fast in the visual field even upon rolling with a relatively low speed of angular fluctuation, and it may deviate from the visual field when the angle of fluctuation is large. Also, upon rolling with a relatively high speed of angular fluctuation, even when the angle of fluctuation is relatively small, the viewed object has a higher speed of angular fluctuation in response to the magnification of the optical apparatus, whereby the image may blur and deteriorate.

There have conventionally been proposed various kinds of image stabilizing apparatus for preventing a viewed image from deteriorating due to fluctuation in the angle of emission of a luminous flux with respect to the optical axis upon vibration or rolling transmitted to the optical apparatus.

For example, Japanese Patent Publication No. 57-37852 discloses a binocular comprising a vibration isolator therein utilizing a rotational inertial body (gyro motor) in order to correct blur of the viewed image in the binocular.

Namely, in this prior art, an erecting prism is disposed on the optical axis between objective and ocular lenses of the binocular so as to be secured onto gimbal suspension means to which the rotational inertial body is attached, whereby the erecting prism is substantially held in the same posture even when the binocular is vibrated upon a manual shake or the like, so as to prevent the viewed image of the binocular from blurring.

In such a kind of prior art utilizing the rotational inertial body and the gimbal suspension means, while the image can be stabilized with a high precision, a high-speed rotator is necessary for obtaining a large inertial force in a small space. Also, the rotator should have a high precision since it is necessary for the rotator to minimize its own vibration. Due to these requirements for small size, high speed, and high precision, the apparatus may become disadvantageous in terms of cost, life, and time necessary for obtaining a required inertial force after the power is turned on. Also, when the effective diameter of the objective lens is increased in order to attain a higher magnification or resolution in the binocular, the erecting prism has a larger size, thereby necessitating a larger inertial force. Consequently, the disadvantages noted above may become greater. Also, a larger amount of electric power may be consumed accordingly.

Therefore, there has been proposed a commonly-assigned image stabilizing apparatus Japanese Unexamined Patent Publication No. 6-250100) in which the gimbal suspension means is equipped with an angular velocity sensor in place of the above-mentioned rotational inertial body, while the rotational position of the gimbal suspension means is controlled on the basis of the output value from the angular velocity sensor so as to secure the posture of the erecting prism with respect to the earth (inertial system). In this apparatus, the erecting prism held by the gimbal suspension means basically has an inertial force and, for high-speed vibrations with a high frequency in particular, exhibits a high performance for holding a posture against a vibration with a relatively large amplitude. Accordingly, a small force is sufficient for controlling the rotational position based on the output from the angular velocity sensor.

Variangle prisms and other kinds of image stabilizing apparatus which drive lenses, however, necessitate an active driving section. Since it is necessary for the driving section to be moved with a high speed in order to correct a large amplitude in high-frequency vibrations, such an amplitude is hard to correct over a large angle range.

Also, in the above-mentioned image stabilizing apparatus for securing the posture of the erecting prism with respect to the earth (inertial system) by controlling the rotational position of the gimbal suspension means, there is a possibility that the gimbal suspension means might be mechanically locked at a position other than its standard position due to an external shock, a failure, or the like.

In this state, when the control system is kept operable as it is, an electric power may be supplied in excess to an actuator such as driving motor in order to return the gimbal suspension means to the standard position, thereby damaging the actuator.

Also, while a control loop is constituted by electric devices such as CPU in the above-mentioned control system, when a driving voltage supplied to such an electric device, CPU in particular, is lowered, the control system may not function correctly, thereby causing a malfunction. As a result, even when the optical apparatus is directed to the aimed object to be viewed, another object positioned in a direction different therefrom may be observed.

SUMMARY OF THE INVENTION

In view of the foregoing, it is an object of the present invention to provide an image stabilizing apparatus which can prevent, even when gimbal suspension means is mechanically locked, an actuator for driving the gimbal suspension means from being damaged, and can make an operator of the optical apparatus recognize this state.

It is another object of the present invention to provide an image stabilizing apparatus which can securely observe an object to be viewed in the aimed direction of the optical apparatus even when the voltage supplied to electric devices constituting the control system is lowered.

The image stabilizing apparatus in accordance with the present invention is attached to an optical apparatus comprising a monocular or binocular optical system including an erecting prism disposed between objective and ocular lenses which are firmly disposed within a case.

The image stabilizing apparatus comprises:

gimbal suspension means having first and second rotational axes respectively extending in transverse and vertical directions of the optical apparatus so as to pivotally attach the erecting prism to the case;

an actuator for pivotally moving the gimbal suspension means about the first and second rotational axes;

first and second angular position data detecting means for respectively detecting angular position data of the gimbal suspension means about the first and second rotational axes;

first and second angular velocity data detecting means, firmly attached to the gimbal suspension means, for respectively detecting angular velocity data of the gimbal suspension means upon a change in posture of the optical apparatus;

feedback control means for controlling pivotal movement of the gimbal suspension means about the first and second rotational axes by driving the actuator, based on the data detected by the angular position data detecting means and angular velocity data detecting means, so as to secure the erecting prism with respect to an inertial system;

locked state judging means for judging whether or not the pivotal movement of the gimbal suspension means is in a locked state by detecting a state of a signal for driving the actuator;

driving signal input stopping means for substantially stopping the driving signal from being inputted to the actuator when it is judged by the locked state judging means that the pivotal movement of the gimbal suspension means is in the locked state; and locked state alarm means for indicating the locked state when it is judged by the locked state judging means that the pivotal movement of the gimbal suspension means is in the locked state.

Preferably, the image stabilizing apparatus in accordance with the present invention comprises:

power voltage detecting means for detecting a level of a driving voltage supplied to an electric device constituting the feedback control means;

power voltage judging means for judging whether or not the voltage level detected by the power voltage detecting means is lower than a predetermined level;

driving signal input stopping means for substantially stopping the driving signal from being inputted to the actuator when it is judged by the power voltage judging means that the voltage level detected by the power voltage detecting means is lower than the predetermined level; and voltage drop alarm means for indicating a drop in voltage level when it is judged by the power voltage judging means that the voltage level detected by the power voltage detecting means is lower than the predetermined level.

Preferably, the locked state alarm means or voltage drop alarm means is formed as an indicator disposed outside the case, so that the operator can easily see the circumstances by eyes.

Preferably, the locked state alarm means and the voltage drop alarm means constitute a single LED indicator device which is configured so as to have flickering patterns differing between respective instances where it is used as the locked state alarm means and the voltage drop alarm means.

Here, the above-mentioned "flickering pattern" encompasses a continuous lighting state as well.

BRIEF DESCRIPTION OF THE DRAWINGS

FIG. 1 is a flowchart showing a part of operations of a CPU in an image stabilizing apparatus in accordance with an embodiment of the present invention;

FIG. 7 is a block diagram for explaining basic functions of the above-mentioned image stabilizing apparatus;

DETAILED DESCRIPTION OF THE PREFERRED EMBODIMENTS

Figure 2:
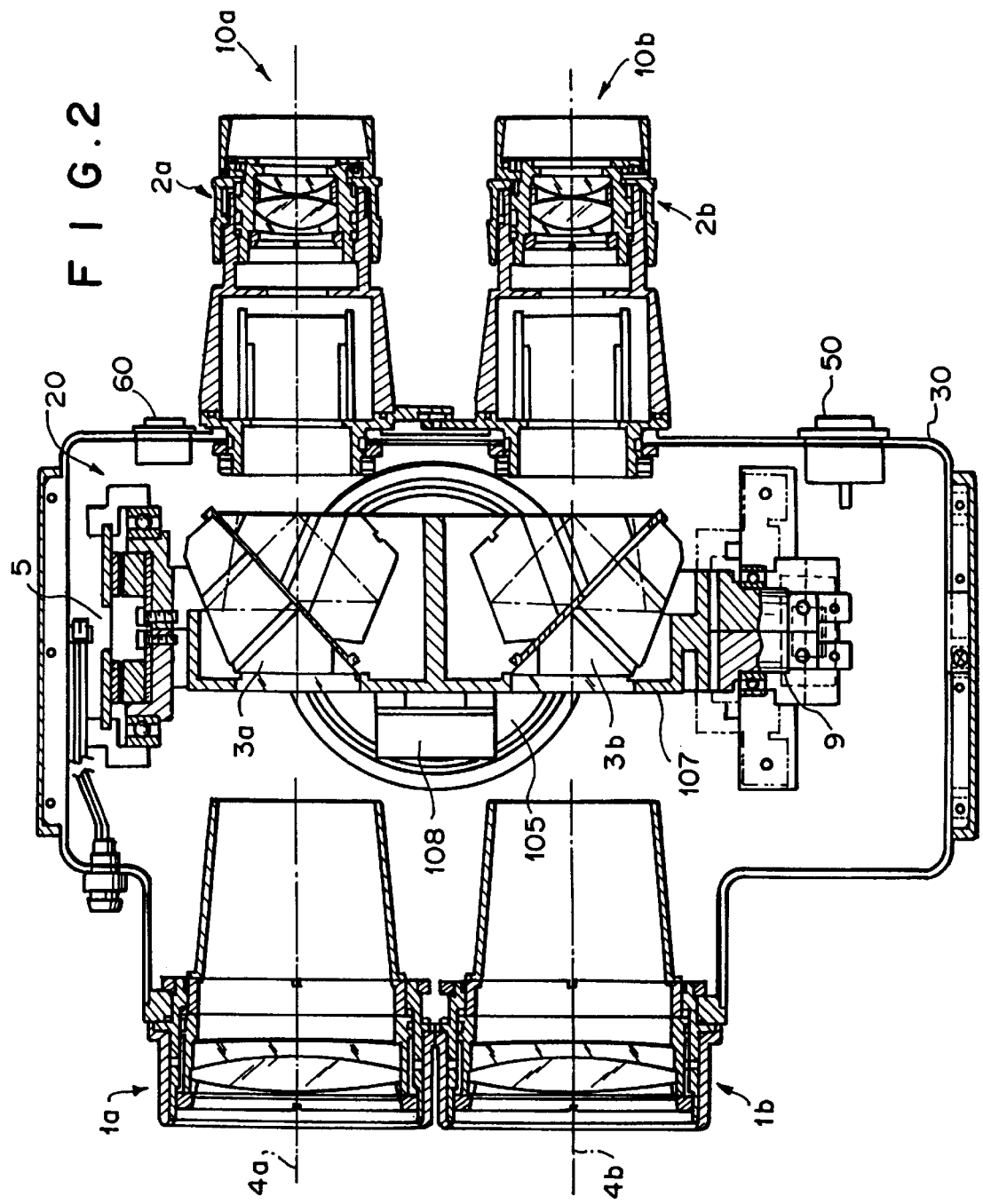
FIG. 2 is a sectional plan view showing a binocular including therein the above-mentioned image stabilizing apparatus.
Figure 3:
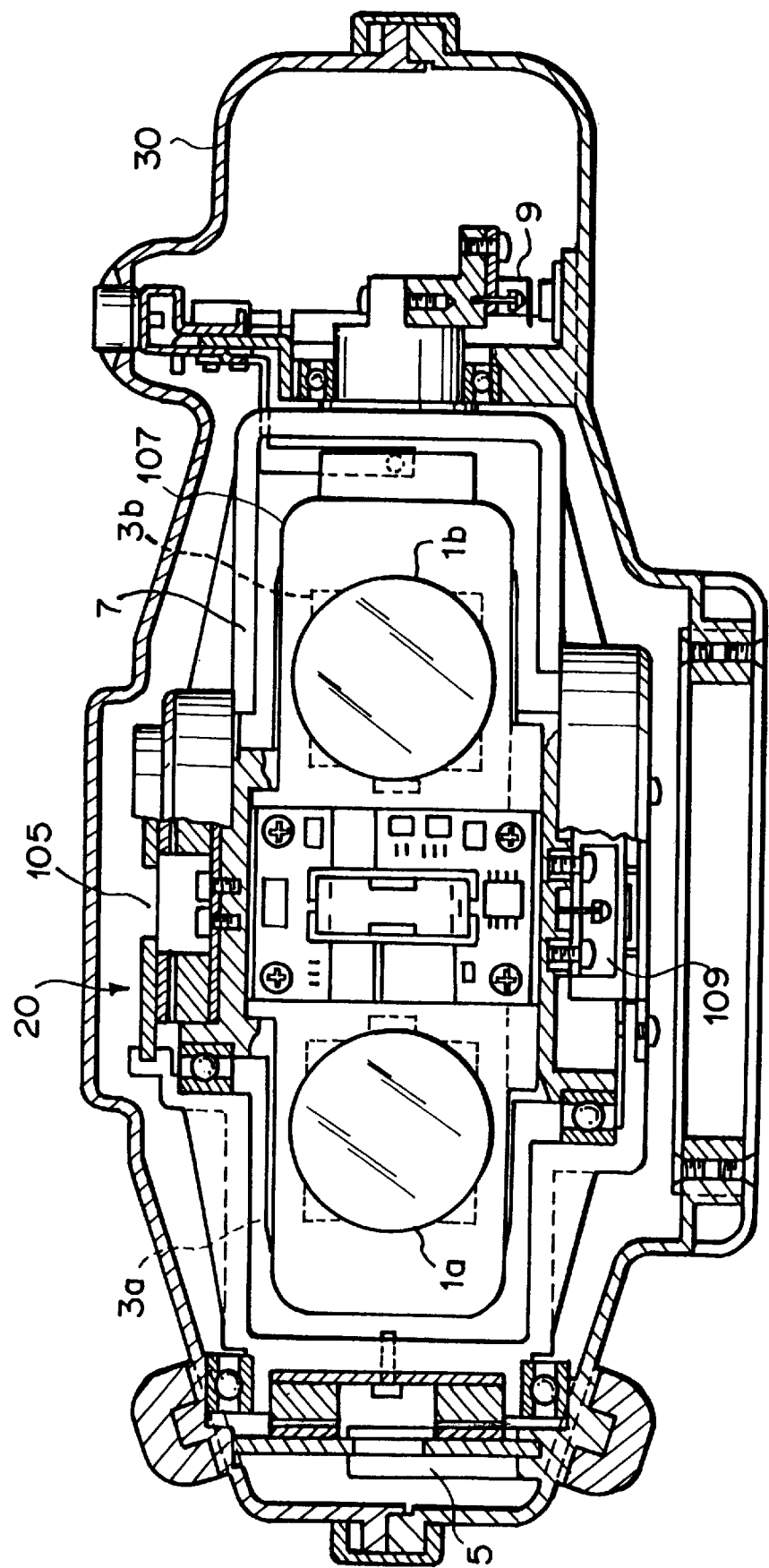
FIG. 3 is a sectional front view showing the above-mentioned binocular.
Figure 4:
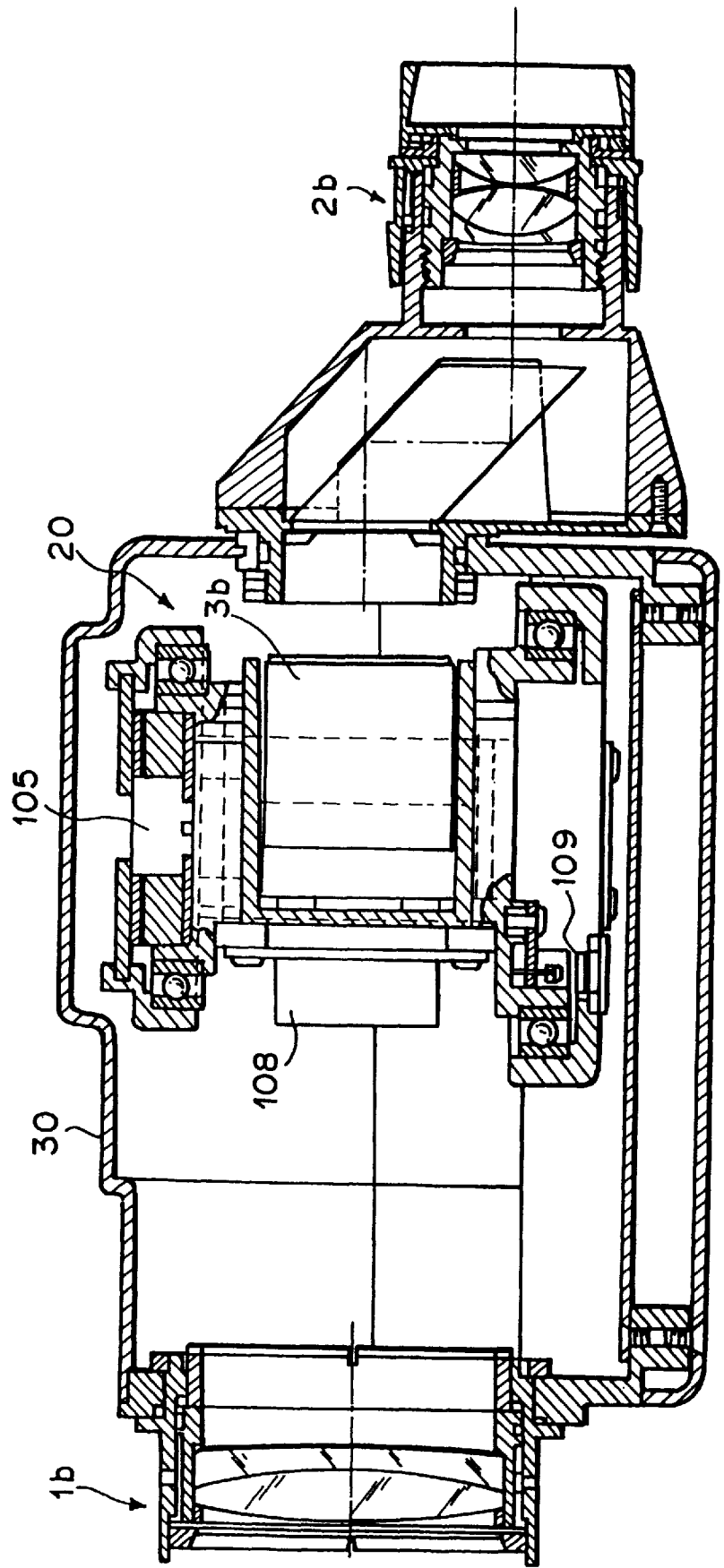
FIG. 4 is a sectional side view showing the above-mentioned binocular.
Figure 5:
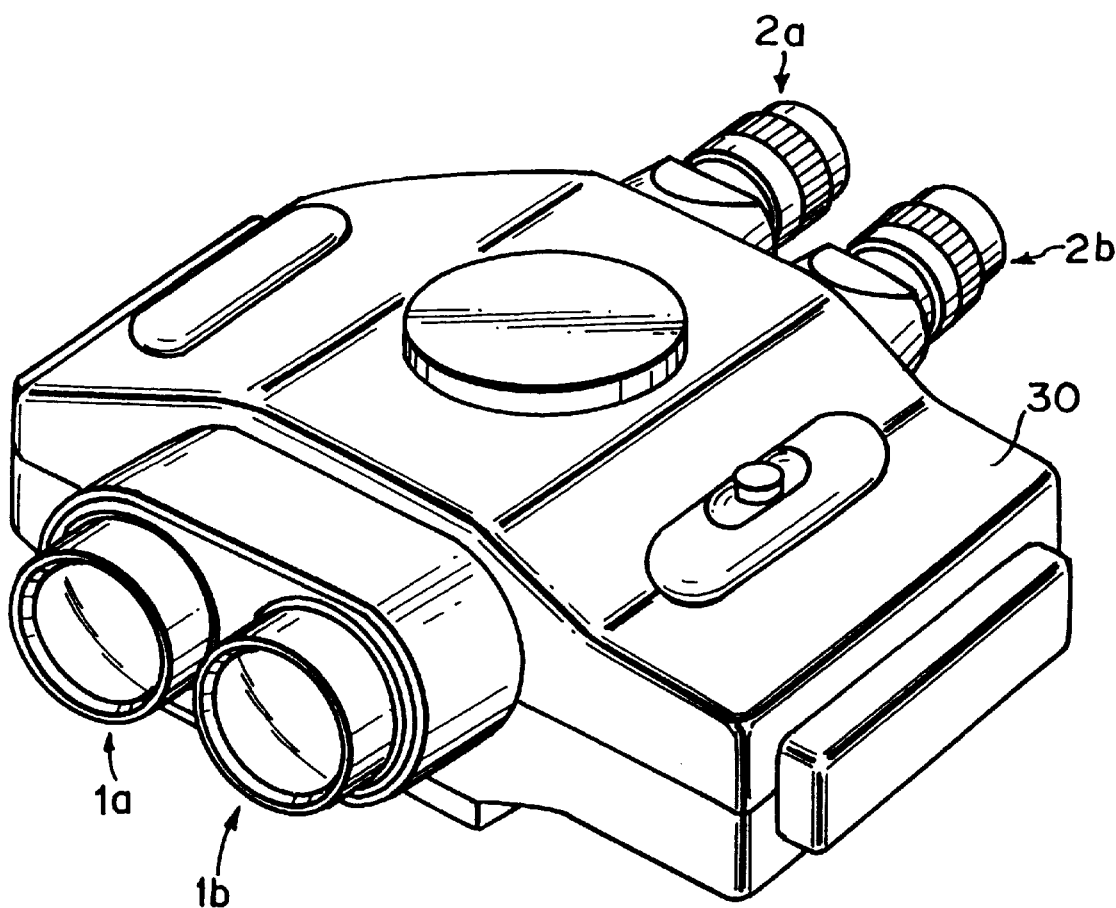
FIG. 5 is a perspective view showing the above-mentioned binocular.

In the following, embodiments of the present invention will be explained with reference to the accompanying drawings.

FIGS. 2, 3, 4, and 5 are respectively a sectional plan view, sectional front view, sectional side view, and perspective view showing a state where an image stabilizing apparatus in accordance with an embodiment of the present invention is built into a binocular. As depicted, a binocular in which an image stabilizing apparatus 20 of this embodiment is built into a case 30 comprises a pair of objective lens systems 1a and 1b; a pair of ocular lens systems 2a and 2b; and a pair of erecting prisms 3a and 3b. The objective lens 1a, the ocular lens 2a, and the erecting prism 3a constitute a first telescopic system 10a; whereas the objective lens 1b, the ocular lens 2b, and the erecting prism 3b similarly constitute a second telescopic system 10b. A pair of these first and second telescopic systems 10a and 10b constitute a binocular system.

The pair of objective lens systems 1a and 1b and pair of ocular lens systems 2a and 2b constituting this binocular system are firmly attached to the case 30 of this optical apparatus, whereas the erecting prisms 3a and 3b are pivotally attached to the case 30 by way of gimbal suspension members 7 and 107 respectively having rotational axes 6 and 106 (see FIG. 6) extending in the vertical directions of the apparatus (directions orthogonal to the extending direction of the optical axis and aligning direction of the objective lens systems 1a and 1b) and in the transverse directions of the apparatus (aligning direction of the objective lens systems 1a and 1b).

In the following, with reference to FIGS. 6 and 7, basic functions which are prerequisite to the apparatus of this embodiment will be explained. Here, in the specification, the vertical directions of the apparatus refer to the directions of depicted arrows A, whereas the transverse directions of the apparatus refer to the directions of depicted arrows C.

Figure 6:
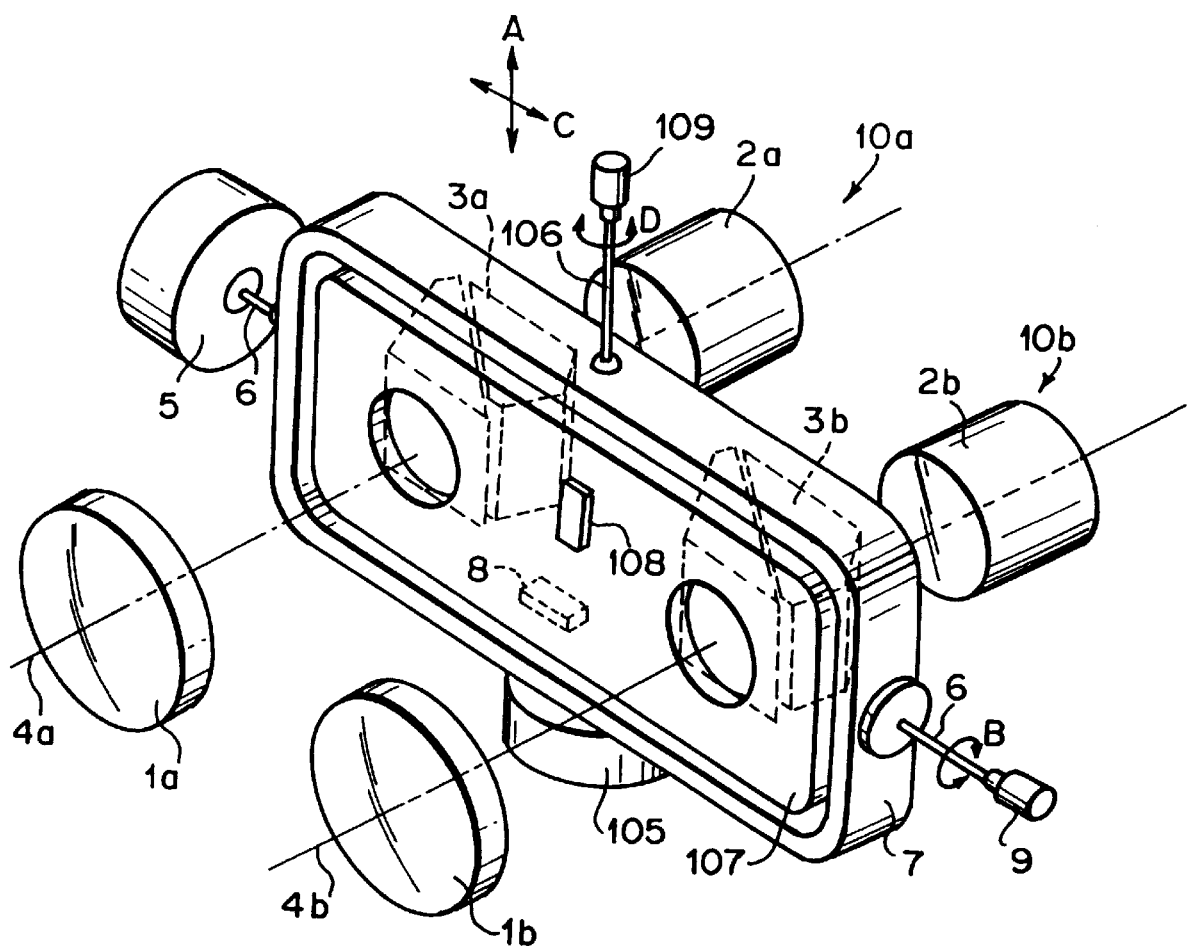
FIG. 6 is a schematic perspective view for explaining basic functions of the above-mentioned image stabilizing apparatus.

In FIG. 6, in a state where the gimbal suspension members 7 and 107 equipped with the erecting prisms 3a and 3b are secured to the case 30, namely, in a state where the erecting prisms 3a and 3b attached to the gimbal suspension members 7 and 107 are secured to the case 30, this optical apparatus attains a configuration of an ordinary binocular system. Hereinafter, optical axes 4a and 4b of the respective telescopic optical systems 10a and 10b in this state will be referred to as the optical axes of this optical apparatus.

Appropriate positions of the objective lens systems 1a and 1b, ocular lens systems 2a and 2b, erecting prisms 3a and 3b, gimbal suspension members 7 and 107, rotational axes 6 and 106, and the like are described in detail in known publications (e.g., Japanese Patent Publication No. 57-37852) and thus will not be explained here.

As shown in FIG. 6, in the apparatus of this embodiment, the inner gimbal suspension member 107 is axially supported by the outer gimbal suspension member 7, thereby forming a gimbal suspension of a double structure. The outer gimbal suspension member 7 is pivotally moved about the rotational axis 6, which extends in the transverse directions of the apparatus, so as to correct blurs of an image in the vertical directions; whereas the inner gimbal suspension member 107 is pivotally moved about the rotational axis 106, which extends in the vertical directions of the apparatus, so as to correct blurs of the image in the transverse directions. The erecting prisms 3a and 3b are attached to the inner gimbal suspension member 107. Here, for convenience of explanation, the upper and lower sides in FIG. 6 are depicted so as to be opposite to those of FIGS. 2 to 5.

An angular velocity sensor 8 is secured to the center part of the upper wall portion of the outer gimbal suspension member 7, whereas an angular velocity sensor 108 is secured to the center part of the front wall portion of the inner gimbal suspension member 107. The angular velocity sensor 8 is a sensor for detecting a rotational angular velocity $\omega_1$ when the outer gimbal suspension member 7 is pivotally moved in the directions of arrows B due to a vertical shake of the case 30, whereas the angular velocity sensor 108 is a sensor for detecting a rotational angular velocity $\omega_2$ when the inner gimbal suspension member 107 is pivotally moved in the directions of arrows D due to a transverse shake of the case 30.

One end of the rotational axis 6 is provided with a position sensor 9 for detecting a rotational angle $\theta_1$ of the rotational axis 6 in order to effect position feedback control in addition to the velocity feedback control based on the detected angular velocity mentioned above; whereas the other end of the rotational axis 6 is provided with a rotating motor 5 which revolves, based on the values detected by the angular velocity sensor 8 and position sensor 9, the rotational axis 6 of the gimbal suspension member 7 such that the erecting prisms 3a and 3b always resume their initial postures upon vertical shakes of the case 30. On the other hand, one end of the rotational axis 106 is provided with a position sensor 109 for detecting a rotational angle $\theta_2$ of the rotational axis 106 in order to effect the position feedback control in addition to the velocity feedback control based on the detected angular velocity; whereas the other end of the rotational axis 106 is provided with a rotating motor 105 which revolves, based on the values detected by the angular velocity sensor 108 and position sensor 109, the rotational axis 106 of the gimbal suspension member 107 such that the erecting prisms 3a and 3b always resume their initial postures upon transverse shakes of the case 30.

In the following, a basic concept of a control loop 1 in the apparatus of this embodiment will be explained with reference to FIG. 7. As depicted, this apparatus comprises amplifiers 11a and 11b for respectively amplifying the angular velocity signal from the angular velocity sensor 8 and the angle signal from the position sensor 9; a CPU 12 for computing, based on these angular velocity and angle signals, an amount of driving of the rotating motor 5 by which the erecting prisms 3a and 3b resume their initial postures and outputting a control signal based on thus computed amount; and a motor driving circuit 13 for amplifying the control signal from the CPU 12 so as to drive the rotating motor 5. Connected to the CPU 12 is a ROM 12a which stores various kinds of programs. As with the signals detected by the angular velocity sensor 8 and position sensor 9, the signals detected by the angular velocity sensor 108 and position sensor 109 are converted into a control signal by a control loop similar to that shown in FIG. 7, whereby the rotating motor 105 is driven by this control signal.

Though two sets of control loops are thus respectively necessary for causing the two pieces of outer and inner gimbal suspension members 7 and 107 to resume their initial postures in the apparatus of this embodiment, the CPU 12 may be used in common.

In the following, a detailed configuration of the control loop will be explained with reference to FIG. 8.

This control loop is constituted by a double feedback loop made of a velocity (angular velocity) feedback loop and a position (angle) feedback loop. Also, this control loop is constituted by a combination of a software loop formed by a microcomputer program of the CPU 12 and a hardware loop.

First, in the velocity feedback loop, an angular velocity $\omega$ of a gimbal suspension 70 (7, 107) about the rotational axis 6 or 106 is detected by an angular velocity sensor 61 (8, 108). After being amplified by a hardware amplifier 62, the detected value $\omega$ is negatively fed back to a motor driving system 68 by way of a subtractor 66 and an amplifier 67 (first velocity feedback loop). Consequently, a reverse rotational torque is generated in a motor 69, thereby effecting a control such that the gimbal suspension 70 resumes its initial posture against a vibration such as a manual shake, namely, such that the erecting prisms 3a and 3b are secured to the earth against a vibration with a large angular velocity.

Also, in this velocity feedback loop, the value detected by the angular velocity sensor 61 is fed into an integrator 65 by way of a subtractor 63 and an amplifier 64. Thereafter, in the subtractor 66, the output value from the integrator 65 is subtracted from the detected value directly fed therein from the amplifier 62, and the result of subtraction is negatively fed back to the motor driving system 68 (second velocity feedback loop). In the case where the value detected by the angular velocity sensor 61 is thus negatively fed back by way of the integrator 65, the control system can function even when the steady-state deviation with respect to a velocity instruction is zero, namely, when a velocity input value in the feedback loop is equal to its velocity output value. Also, since the loop gain can be doubled, the gimbal suspension 70 can be stabilized at a high speed (i.e., accuracy in stabilization can be increased).

Since the integrator 65 functions to average the input value, and its output value is subtracted from the detected angular velocity value in the subtractor 66, it can be supposed to have a damper-like function for preventing the first velocity feedback loop from oscillating.

In the position feedback loop, on the other hand, a position sensor 81 (9, 109) detects an angular position $\theta$ of the gimbal suspension 70 about the rotational axis 6 or 106, thus detected value is amplified by a hardware amplifier 82, thus amplified signal is compared with and subtracted from a reference angular position $\theta_0$, which is an instruction signal, in a software amplifier 83, the result of subtraction is returned to the motor driving system 68 so as to control the rotating motor 69 (5, 105) such that the gimbal suspension 70 approaches the angular position $\theta_0$ of the midpoint of the visual axis.

Basically, in the above-mentioned control system, the posture of the gimbal suspension 70 can be controlled by the velocity feedback loop alone. In an optical apparatus such as binocular, however, there is a case where panning or tilting is effected to a large extent. In such a case, when the velocity feedback loop is used alone in the control, the gimbal suspension 70 may pivot greatly so as to collide with an end portion of the case 30 at its movable limit.

Accordingly, in this position feedback loop, when it is detected that the gimbal suspension 70 has greatly pivoted, namely, when the detected value from the position sensor 81 compared with a predetermined reference level (e.g., ±2.5 degrees when the movable limit angle is ±5 degrees) in the subtractor 83 is greater in absolute value than the latter, a signal corresponding to their difference is returned to the motor driving system 68, whereby the motor 69 is driven so as to forcibly return the gimbal suspension 70 toward the midpoint of the visual axis. Here, it is not always necessary to provide the subtractor 83. A value in proportion to the angle value detected by the position sensor 81 may be fed into the subtractor 63.

Consequently, the gimbal suspension 70 is prevented from accidentally colliding with the end portion of the case 30 at its movable limit upon panning, tilting, or the like, while the trackability in panning or tilting is made favorable.

On the other hand, in the image stabilizing apparatus that secures the postures of the erecting prisms 3a and 3b with respect to the earth (inertial system) by controlling the rotational position of the gimbal suspension members 7 and 107, there is a possibility that the gimbal suspension members 7 and 107 might be mechanically locked at positions other than their standard positions due to an external shock, a failure, or the like.

In such a state, when the control system is kept operable as it is, voltages may be supplied in excess to the rotating motors 5 and 105 in order to return the gimbal suspension members 7 and 107 to their standard positions, thereby damaging the rotating motors 5 and 105.

Also, while the CPU 12 constitutes a control loop in the above-mentioned control system, when the driving voltage supplied to the CPU 12 is lowered, the control system may not function normally, thus causing a malfunction. As a result, even when the optical apparatus is directed to the aimed object to be viewed, another object positioned in a direction different therefrom may be observed.

Accordingly, in the apparatus of this embodiment, it is judged by means of software whether or not the gimbal suspension members 7 and 107 are mechanically locked and whether or not the power voltage supplied to the CPU 12 is lower than a predetermined level. When it is judged that the gimbal suspension member 7 and 107 are mechanically locked or that the power voltage is lower than the predetermined level, the control system is stopped from operating, thus terminating the supply of driving power to the rotating motors 5 and 105. Further, in order to indicate this state, an alarm LED 60 disposed on the back side of the case 30 is lit or flickered.

In the following, the judgment of the locked state and power voltage drop state and the alarming in the apparatus of the above-mentioned embodiment will be explained with reference to the block diagram of FIG. 8 and the flowchart of FIG. 1.

Figure 8:
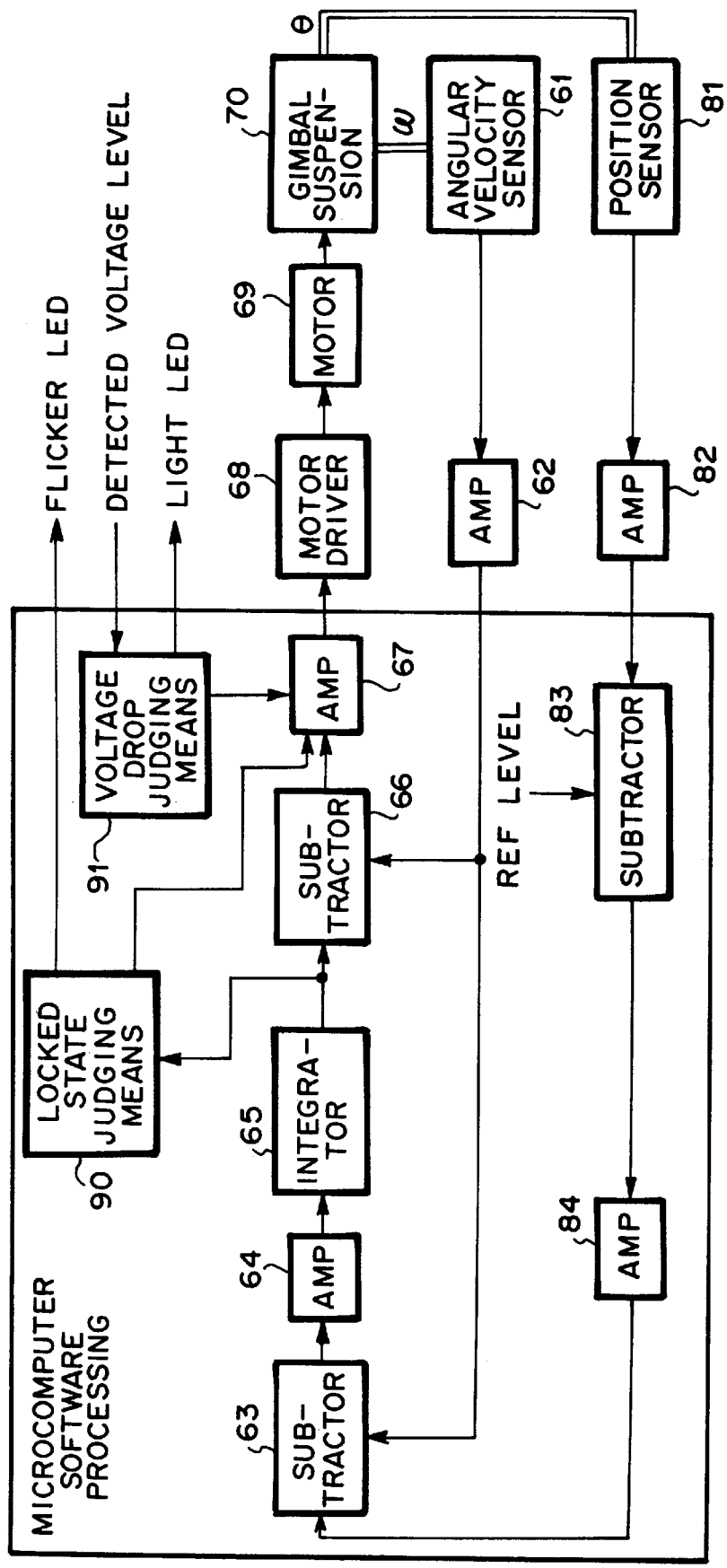
FIG. 8 is a block diagram showing a control loop composed of software and hardware in the above-mentioned image stabilizing apparatus.

Namely, in this apparatus, as shown in FIG. 8, the output value of the integrator 65 is detected, and a locked state judging means 90 judges whether or not the gimbal suspension 70 is in a locked state at a position deviating from the midpoint of the visual axis. When it is judged to be in the locked state, the output of the amplifier 67 is set to zero, thereby stopping a motor driving power from being supplied from the motor driving system 68. Further, when it is judged to be in the locked state, the locked state judging means 90 flickers the alarm LED 60. Consequently, even when the gimbal suspension 70 is placed in the locked state, the motor 69 is prevented from being supplied with an excess power and being damaged thereby. Also, the operator can easily recognize this state.

The integrator 65 integrates, with respect to time, the angular velocity of the gimbal suspension 70 detected by the angular velocity sensor 61. When the gimbal suspension 70 vibrates a little in both rotating directions from the mid point of the visual axis, the angular velocity values detected on both sides are offset by each other, whereby the output value from the integrator 65 becomes very small and substantially zero. For example, when the gimbal suspension 70 is mechanically locked at the end portion of the case 30 at its movable limit due to a failure, the integrated value of detected angular velocity in the integrator 65 drastically increases. Accordingly, in the locked state judging means 90, a large value which cannot be outputted from the integrator 65 in the normal operation of the gimbal suspension 70 is set as a reference value, and this reference value and the output value from the integrator 65 are always compared with each other.

In the apparatus of this embodiment, though not depicted in FIG. 8, the driving voltage level supplied to the CPU 12 is detected by voltage detecting means, and thus detected level is compared with a reference voltage level (threshold level; e.g., ±4 V) at predetermined sampling intervals. When the detected value is judged to be lower than the reference voltage level, a voltage drop state judging means 91 nullifies the output of the amplifier 67 in a manner similar to that mentioned above, thereby stopping the motor driving power from being transmitted from the motor driving system 68. Further, when the power voltage is judged to be in a lowered state, the voltage drop state judging means 91 continuously lights the alarm LED 60.

Consequently, even when the power voltage is lowered to an extent that the CPU 12 may malfunction, the gimbal suspension 70 can be prevented from being accidentally oriented to a direction not intended by the operator.

In the following, an operation flow of the CPU 12 concerning the foregoing state judgment and alarm indication will be explained with reference to FIG. 1.

First, when a main switch 50 of the apparatus is turned on, the CPU 12 starts operating (S1), and an initial setting is effected (S2).

Then, it is judged whether or not the power voltage supplied to the CPU 12 is in a lowered state (S3). If it is judged to be in the lowered state, then the flow proceeds to step 4 (S4), thereby stopping the control system and lighting the alarm LED 60 (S5).

The detection of the lowered state of power voltage, which is a prerequisite to the above-mentioned step 3 (S3), is effected by a subroutine (power voltage detection routine) comprising steps T1 to T4. In this subroutine, the power voltage level detected by the voltage detecting means is read out (T1), a reference voltage which has been preset in a memory is read out (T2), thus read-out two voltage levels are compared with each other (T3), and a voltage drop detection signal is outputted (specifically, a flag is turned on) when the detected voltage level is lower than the reference voltage level (T4).

Accordingly, the actual processing in the above-mentioned step 3 (S3) is to judge whether or not the flag is turned on in the subroutine.

The operation for stopping the system in the above-mentioned step 4 (S4) and the operation for lighting the alarm LED 60 in the above-mentioned step 5 (S5) are the same as those explained with reference to FIG. 8.

When the power voltage is judged to be normal at step 3 (S3), on the other hand, the flow proceeds to a process for judging a locked state at step 6 (S6) and later. First, the angular velocity value detected by the angular velocity sensor 61 is read out (S6); the angle value detected by the position sensor 81 is read out (S7); the detected angle value is amplified (by means of the amplifier 84; S8); the read-out value of detected angular velocity is subtracted from the amplified value of detected angle (by means of the subtractor 63; S9); the value resulting from the subtraction is integrated (amplified) with respect to time (by means of the integrator 65; S10); and then it is judged whether or not this integrated value is at least a predetermined level and in a saturated state, so as to judge whether or not the gimbal suspension is in a locked state (by means of the locked state judging means 90; S11).

If the integrated signal is consequently judged to be saturated, i.e., it is judged to be in a locked state, the control system is stopped (S12), and the alarm LED 60 is flickered (S13).

By contrast, if the integrated value is not in the saturated state, and therefore it is judged not to be in a locked state, the integrated value is subtracted from the detected angular velocity value, and the resulting value is amplified (by means of the subtractor 66 and the amplifier 67; S14), and the driving signal is outputted to the motor driving system 68 (S15).

Thereafter, the flow returns to step 3 (S3), and the processing of S3 to S15 is repeated. Here, even when the operation for lighting or flickering the alarm LED 60 is effected at step 5 (S5) or step 13 (S13), the flow similarly returns to step 3 (S3).

Though the output value of the integrator 65 is detected in order to judge the locked state, and the output value of the amplifier 67 is set to zero when the system is to be stopped in the foregoing embodiment, positions of the section for detecting the values for judging the locked state and the section for adjusting output for stopping the system should not be restricted thereto. The former may be placed at any position where the gimbal suspension 70 placed at a deviated position for a predetermined period of time or longer can be detected. The latter may be placed at any position where an operation for stopping a driving power from being supplied to the motor 69 can consequently be effected.

Though the single alarm LED 60 is commonly used for indicating the locked state and the power voltage drop state in the foregoing embodiment, dedicated alarm LEDs may be respectively provided therefor.

Also, other failures and the like may be indicated, and the two gimbal suspension members 7 and 107 may be indicated so as to be distinguishable from each other (e.g., by their flickering intervals). Further, the contents of alarm may be indicated by letters on a liquid crystal display plate or by voice over speaker means.

Figure 9:
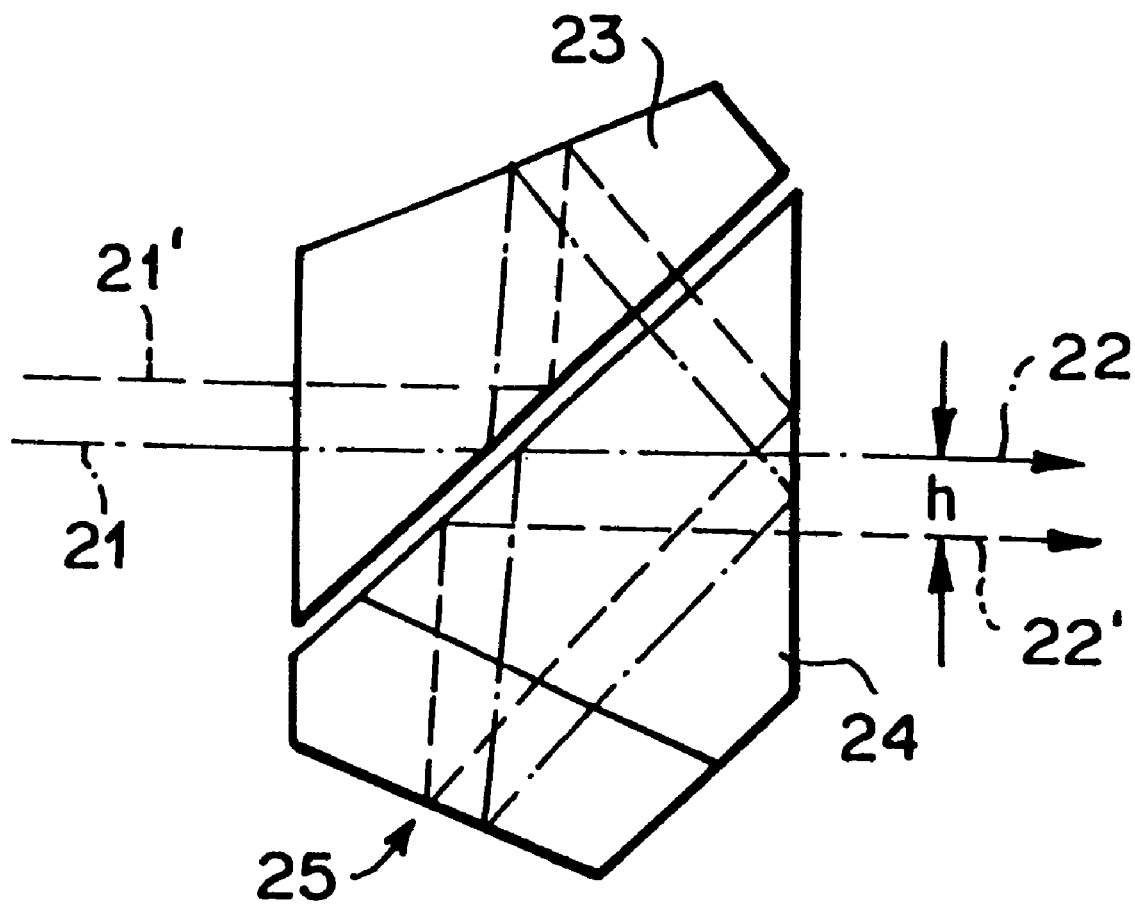
FIG. 9 is a side view for explaining an erecting prism shown in FIG. 2.

Examples of the erecting prisms 3a and 3b include Schmidt erecting prisms, Abbe erecting prisms, Bauern Fend erecting prisms, Porro erecting prisms, and roof erecting prisms. Among these prisms, FIG. 9 shows a Schmidt erecting prism. As depicted, this Schmidt erecting prism is constituted by prisms 23 and 24, while a part 25 of the prism 24 serves as a roof reflecting surface. In such an erecting prism, there is a position of incident light optical axis at which an incident light optical axis 21 and an emanating light optical axis 22 can be placed on the same line as depicted. As shown in FIG. 9, in such an erecting prism in which the incident light optical axis 21 and the emanating light optical axis 22 can be placed on the same line, a light beam 21' which is in parallel to the optical axis 21 and separated upward therefrom by h becomes, after being transmitted through the erecting prism, a light beam 22' which is in parallel to the optical axis 22 and separated downward therefrom by h. Here, not only such a prism in which the incident light optical axis and the emanating light optical axis are placed on the same line but also other prisms can be used as long as they are erecting prisms.

Each of the angular velocity sensors 8 and 108 is a piezoelectric vibration gyro sensor utilizing Coriolis force, which comprises a columnar vibrator having a cylindrical form or the like and a plurality of pieces of piezoelectric ceramic members. Namely, a side face of the columnar vibrator is provided with at least two pieces of detection-purpose piezoelectric ceramic members and at least one piece of feedback-purpose piezoelectric ceramic member.

The respective detection-purpose piezoelectric ceramic members output their detected signals having different values in response to a vibration, and a difference therebetween is computed, thereby yielding an angular velocity.

The feedback-purpose piezoelectric ceramic member is used for correcting the phase of the detected signals.

Since these angular velocity sensors 8 and 108 have a simple configuration and a very small size, the image stabilizing apparatus 20 itself can have a simple configuration and a small size. Also, since they have a high S/N and a high precision, the angular velocity control can be effected with a high accuracy.

Without being restricted to the above-mentioned embodiment, the image stabilizing apparatus of the present invention can be modified in various manners. For example, as the angular velocity data detecting means, not only the piezoelectric vibration gyro sensors of columnar vibrator type but those using various types of vibrators such as triangular prism vibrator type, quadrangular prism vibrator type, and tuning fork vibrator type can be used. Further, other kinds of various angular velocity sensors can be used.

Here, as the angular position data detecting means, various kinds of angle sensors such as resolver, synchro, and rotary encoder may be used in place of the above-mentioned position sensor.

Though the apparatus of the above-mentioned embodiment is configured so as to be applied to a binocular, the image stabilizing apparatus of the present invention can also be configured so as to be applicable to a monocular. Also, similar effects can be attained when the apparatus is attached to a camera such as video camera.

In the image stabilizing apparatus of the present invention, the gimbal suspension means attached to the erecting prism is controlled so as to resume its original posture, i.e., to be secured with respect to the earth (inertial system), by an electric control system using the angle data detecting means, control circuit system, and rotating motor. Since such a system is lightweight, small in size, inexpensive, and low in power consumption, the optical apparatus as a whole can attain a lighter weight, smaller size, lower power consumption, and lower manufacturing cost.

Also, the image stabilizing apparatus of the present invention is configured such that the state of a signal for driving and controlling the actuator is detected, it is judged whether or not the pivotal movement of the gimbal suspension means is in a locked state, the driving power is stopped from being supplied to the actuator when the pivotal movement of the gimbal suspension means is judged to be in the locked state, whereby there is no risk of an excess power being supplied to the actuator in the locked state. Accordingly, even when the gimbal suspension means is mechanically locked due to a failure or the like, the actuator is prevented from being damaged.

Also, when it is judged to be in the locked state, an alarm indicates this state so as to inform the operator of the circumstances, whereby the operator can rapidly respond to the locked state.

Further, the image stabilizing apparatus of the present invention is preferably configured such that the power voltage supplied to devices such as CPU is detected, it is judged whether or not thus detected value is lower than a predetermined reference level, and the input into the actuator is stopped when the detected value is lower than the reference level. It is due to the fact that, in this case, the object to be viewed in the direction at which the optical apparatus such as binocular is oriented can securely be observed.

Also, such a power voltage drop state is preferably indicated so that the operator can be informed thereof, since measures such as battery exchange can be effected rapidly.

What is claimed:

1. An image stabilizing apparatus attached to an optical apparatus, said optical apparatus comprising a monocular or binocular optical system including an erecting prism disposed between objective and ocular lenses which are firmly disposed within a case;

said image stabilizing apparatus comprising:

gimbal suspension means having first and second rotational axes respectively extending in transverse and vertical directions of said optical apparatus so as to pivotally attach said erecting prism to said case;

an actuator for pivotally moving said gimbal suspension means about said first and second rotational axes;

first and second angular position data detecting means for respectively detecting angular position data of said gimbal suspension means about said first and second rotational axes;

first and second angular velocity data detecting means, firmly attached to said gimbal suspension means, for respectively detecting angular velocity data of said gimbal suspension means upon a change in posture of said optical apparatus;

feedback control means for controlling pivotal movement of said gimbal suspension means about said first and second rotational axes by driving said actuator, based on the data detected by said angular position data detecting means and angular velocity data detecting means, so as to secure said erecting prism with respect to an inertial system;

locked state judging means for judging whether or not the pivotal movement of said gimbal suspension means is in a locked state by detecting a state of a signal for driving said actuator;

driving signal input stopping means for substantially stopping said driving signal from being inputted to said actuator when it is judged by said locked state judging means that the pivotal movement of said gimbal suspension means is in said locked state; and locked state alarm means for indicating said locked state when it is judged by said locked state judging means that the pivotal movement of said gimbal suspension means is in said locked state.

2. An image stabilizing apparatus according to claim 1, wherein said locked state alarm means is formed as an indicator disposed outside said case.

3. An image stabilizing apparatus according to claim 1, comprising:

power voltage detecting means for detecting a level of a driving voltage supplied to an electric device constituting said feedback control means;

power voltage judging means for judging whether or not the voltage level detected by said power voltage detecting means is lower than a predetermined level;

driving signal input stopping means for substantially stopping the driving signal from being inputted to said actuator when it is judged by said power voltage judging means that the voltage level detected by said power voltage detecting means is lower than said predetermined level; and voltage drop alarm means for indicating a drop in voltage level when it is judged by said power voltage judging means that the voltage level detected by said power voltage detecting means is lower than said predetermined level.

4. An image stabilizing apparatus according to claim 3, wherein said voltage drop alarm means is formed as an indicator disposed outside said case.

5. An image stabilizing apparatus according to claim 4, wherein said locked state alarm means and voltage drop alarm means constitute a single LED indicator device which is configured so as to have flickering patterns differing between respective instances where said LED indicator device is used as said locked state alarm means and said voltage drop alarm means.

* * * * *